UNITED STATES PATENT OFFICE.

ARTHUR EICHENGRÜN, OF BERLIN, GERMANY.

CELLULOSE-ACETATE COMPOSITION AND PROCESS OF MAKING THE SAME.

1,015,155.   Specification of Letters Patent.   Patented Jan. 16, 1912.

No Drawing.   Application filed January 21, 1910.   Serial No. 539,246.

*To all whom it may concern:*

Be it known that I, ARTHUR EICHENGRÜN, doctor of philosophy, chemist, a subject of the King of Prussia and the German Emperor, residing at 87 Konstanzerstrasse, Berlin, Kingdom of Prussia, German Empire, have invented new and useful Improvements in Cellulose-Acetate Compositions and Processes of Making the Same, of which the following is a specification.

This invention relates to new compositions of matter comprising cellulose acetates, and the manufacture of said compositions, and has for its object to obtain solutions of cellulose acetates which are more adapted for manufacturing celluloid like masses, varnishes, coating, etc., than the solutions of cellulose acetates hitherto known.

I have found that cellulose acetates, particularly those soluble in acetone or acetic ether, can be readily converted into solutions, adapted to be worked up further into plastic masses, by the simultaneous action of alcohols and other liquids which do not dissolve cellulose acetates when heated or when cold. I have especially found mixtures of hydrocarbons and alcohols as suitable for my purposes. Cellulose acetates are insoluble in highly concentrated alcohols alone and in hydrocarbons alone both when heated and when cold; on the other hand, as I have discovered, they will dissolve in a mixture of hydrocarbons and alcohols under the action of heat. Of alcohols particularly the aliphatic have proved suitable, and of hydrocarbons the aromatic. Those boiling below 100° C. come particularly into consideration. The choice of the substances depends on the price.

My process is carried into practice by treating the cellulose acetate which is to be dissolved with the mixture of hydrocarbon and alcohol and heating the same. It is preferable to heat to approximately the boiling point of the mixed solvent without exceeding the same.

Example I: 2 kg. cellulose acetate soluble in acetic ether and made by mineral acid acting on cellulose acetate soluble in chloroform are transfused with a mixture of 10 kg. ethyl alcohol and 10 kg. benzene $C_6H_6$. This is slowly heated with constant agitation to 60° C., which is preferably done in the water-bath, and heated finally to the boiling point of the mixture of benzol and ethyl alcohol (about 75° C.). The cellulose acetate is completely dissolved.

Example II: 2 kg. cellulose acetate are mixed with $2\frac{1}{2}$ kg. methyl alcohol and 2 kg. toluol and heated, at first slowly, until about 60° C. and finally to a temperature up to the boiling point of the mixed solvent. When the solutions cool the cellulose acetate is completely precipitated in the form of a voluminous fibrous mass. This precipitation can be prevented by adding to the solution or directly to the solvent mixture used for the solution solvents which are capable of dissolving the acetates even when cold, such as acetone, acetic ether, acetic acid. In this manner solutions of cellulose acetate which remain fluent or liquid or have a syrupy character are obtained. Substances which are able to dissolve cellulose acetate act in like manner, such as dichlorhydrin, acetate of glycerin, ether of lactic acid, and so on. When cold, honey-like viscous or gelatinizing masses are obtained according in each instance to the quantity of these admixtures. This is particularly the case when, as admixture, camphor or camphor substitutes, such as acidyl derivatives of primary and secondary aromatic amins, aromatic sulfo compounds, aromatic nitro compounds, phenol derivatives are employed as admixture. The admixture of cellulose acetates, solvent and camphor substitute, when employed in the proper proportions to obtain solid or firm bodies can be allowed to cool and congeal after solution has taken place. Blocks are obtained which in spite of the presence of the entire solvent can be cut and readily worked up further. The melted masses may be molded while still molten and only then allowed to congeal. For example they may be allowed to pass through round orifices and in this manner tubes, round rods, threads, filaments or the like can be obtained.

Admixtures under the present invention in such proportions and of such character as to yield firm plastics, suitable as substitutes for celluloid and the like, being hard when cold and possessing springy elastic properties, I do not however herein claim, such compositions, and the processes of making the same, forming part of the subject matter of my copending and divisional application 607,617, filed February 9, 1911.

The solvents and the admixtures may be added either before or during the operation of solution as well as after such operation. The solutions thus obtained which remain liquid may be applied on surfaces, such as paper, fabric, leather and the like, for varnishing or impregnating. The solutions which congeal when cold may be poured hot on to supports or applied thereto after congealing by pressure, for example by rollers or presses. In this case heat is preferably applied.

My process can also be carried into practice by adding the liquids in succession, or by first mixing cellulose acetate with camphor or camphor substitutes and subsequently adding the solvents.

Example III: 2 kg. cellulose acetate are transfused with a mixture of 10 kg. alcohol and 10 kg. benzene, first heated with agitation to 60° C. and finally to the boiling point. The mixture is allowed to cool when 400 grms. dichlorhydrin and 2 kg. acetin (diacetate of glycerin) are added. A viscous solution is obtained which can readily be poured over supports.

Example IV: 2 kg. cellulose acetate are mixed with 1 kg. acetochlorhydrin, to which 2½ kg. methyl alcohol and 2 kg. toluol are added, heated slowly, with stirring, to about 60° C. A viscous solution is formed which when cold congeals to a firm gelatinous mass and can be readily converted by heat into a liquid condition without a liquid part separating off.

Example V: 2 kg. cellulose acetate, ½ kg. acetate of glycerin, 3 kg. ethyl alcohol and 3 kg. benzene are mixed together and heated to about 60° C. when a homogeneous, transparent, plastic mass is obtained which when cold forms a firm block able to be cut, pressed and molded.

Example VI: 2 kg. cellulose acetate are mixed with stirring with 6 kg. acetone until a uniform, syrup-like solution is obtained. 5 kg. benzene and 5 kg. alcohol are added to this solution. When heated to about 50° to 60° C. two layers which do not mix are first formed, but after a time a perfectly homogeneous solution is produced which can be diluted optionally by further quantities of the alcohol-benzol mixture. Also, cellulose acetate may be treated directly with a mixture of solvents, such as acetone, and non-solvents, such as alcohol and benzene, without heating being necessary. Also, acetone may be added to the alcohol-benzene solutions and the same may be substituted wholly or partially by other solvents, such as acetic ether, glacial acetic acid, or such may be added to the mixture. Benzene may be substituted wholly or partially by other liquids, for example water. In all instances viscous, but relatively weak solutions are obtained which congeal only after some time according, in each instance, to the quantity of acetone or solvent admixture, or become viscous or remain permanently liquid.

What I claim as my invention and desire to secure by Letters Patent, is:—

1. The herein described process of manufacturing solutions of cellulose acetates, which comprises treating cellulose acetates with mixtures of alcohols and hydrocarbons under the action of heat.

2. A composition comprising a cellulose acetate dissolved in an alcohol and a hydrocarbon.

3. The process of manufacturing solutions of cellulose acetates, which comprises forming a mixture of aliphatic alcohol and an aromatic hydrocarbon, placing the cellulose acetate in the mixture and subjecting the mass to the action of heat.

4. The process of manufacturing solutions of cellulose acetates, which comprises mixing equal quantities by weight of alcohol and a hydrocarbon, adding thereto one-tenth the amount in weight of cellulose acetate, heating slowly, under constant agitation, up to 60° C. and then raising the temperature up to the boiling point of the mixture of alcohol and hydrocarbon.

5. The process of manufacturing solutions of cellulose acetates, which comprises forming a mixture of cellulose acetate, methyl alcohol and benzol, heating the same slowly up to the boiling point of the alcohol and benzol mixture and adding to said solution a solvent capable of dissolving the acetates when cold.

6. A composition comprising a cellulose acetate dissolved in liquid aliphatic alcohols and liquid aromatic hydrocarbons.

7. The herein described process of manufacturing compositions comprising a cellulose acetate which comprises treating such acetate with a mixture comprising an alcohol and a hydrocarbon under the action of heat.

8. As a new composition of matter, a fluent composition adapted for varnishing, impregnating and the like, said composition comprising a cellulose acetate and a substance normally having solvent power for such acetate, together with a solvent mixture comprising two non-solvents for such acetate, one such non-solvent being an alcohol and the other being a hydrocarbon.

9. As a new composition of matter, a fluent solution comprising a cellulose acetate and about ten times as much of a solvent mixture comprising substantially equal proportions of an alcohol and a hydrocarbon, such solution being homogeneous.

10. The process of manufacturing fluent solutions of cellulose acetate which comprises mixing substantially equal quantities by weight of an alcohol and a hydrocarbon, adding thereto about a tenth the total amount in weight of cellulose acetate, heating slowly under constant agitation up to 60° C., and then raising the temperature up to the boiling point of the mixture of alcohol and hydrocarbon, a body normally having solvent power for cellulose acetate being added to the admixture during the dissolving operation.

In testimony whereof I affix my signature in presence of two witnesses.

ARTHUR EICHENGRÜN.

Witnesses:
 HENRY HASPER,
 WOLDEMAR HAUPT.